(12) United States Patent
Shima

(10) Patent No.: US 7,417,529 B2
(45) Date of Patent: Aug. 26, 2008

(54) NETWORK DEVICE AND DEVICE MONITORING METHOD

(75) Inventor: Toshihiro Shima, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 173 days.

(21) Appl. No.: 11/000,931

(22) Filed: Dec. 2, 2004

(65) Prior Publication Data
US 2005/0144275 A1 Jun. 30, 2005

(30) Foreign Application Priority Data
Dec. 2, 2003 (JP) ............... 2003-402735

(51) Int. Cl.
*G09F 25/00* (2006.01)
(52) U.S. Cl. ............... 340/286.01; 340/506; 340/3.1
(58) Field of Classification Search ............ 340/286.01, 340/506, 3.1
See application file for complete search history.

(56) References Cited

U.S. PATENT DOCUMENTS 5,400,246 A * 3/1995 Wilson et al. ............... 700/17

2004/0165206 A1 8/2004 Aoki et al.

FOREIGN PATENT DOCUMENTS

| JP | 5-344083 A | 12/1993 |
|---|---|---|
| JP | 2002-215472 A | 8/2002 |
| JP | 2003-99342 A | 4/2003 |
| JP | 2003-228414 A | 8/2003 |
| JP | 2004-206682 A | 7/2004 |

* cited by examiner

*Primary Examiner*—Daryl C Pope
(74) *Attorney, Agent, or Firm*—Sughrue Mion, PLLC

(57) ABSTRACT

A network board specifies a connected printer by acquiring a model name and a serial number of the printer. If monitored items of this printer are held in a connected printer list, the network board monitors the printer in accordance with the monitored items. On the other hand, when the monitored items of the printer are not held in the connected printer list, the network board newly acquires the monitored items of the printer from a server. Consequently, it becomes possible for the network board to automatically identify a model of a printer to be monitored and monitor the printer based on held monitored items.

18 Claims, 13 Drawing Sheets

| T10 | T12 | T14 | T16 PAPER REMAINING AMOUNT | | T18 TONER REMAINING AMOUNT | | | | T20 INK REMAINING AMOUNT | | | | | | |
|---|---|---|---|---|---|---|---|---|---|---|---|---|---|---|---|
| LAST MONITORING | MODEL NAME | SERIAL NUMBER | A3 | A4 | Y | M | C | K | Y | M | C | LM | LC | DY | K |
|  | LP9600 A3 MONOCHROME LASER | ABC 0001 | ○ | ○ |  |  |  |  |  |  |  |  |  |  |  |
| ○ | LP9500C A3 COLOR LASER | ABC 1111 | ○ | ○ | ○ | ○ | ○ | ○ |  |  |  |  |  |  |  |
|  | LP1900C A4 COLOR LASER | ABC 2222 |  | ○ | ○ | ○ | ○ | ○ |  |  |  |  |  |  |  |
|  | PM900C INK JET | XYZ 3333 |  | ○ |  |  |  |  | ○ | ○ | ○ | ○ | ○ | ○ | ○ |
|  | MJ900C INK JET | XYZ 4444 |  | ○ |  |  |  |  | ○ | ○ | ○ |  |  |  | ○ |

| T30 | T32 | T34 TONER REMAINING AMOUNT | | | | T36 INK REMAINING AMOUNT | | | | | | |
|---|---|---|---|---|---|---|---|---|---|---|---|---|
| MODEL NAME | PAPER REMAINING AMOUNT | | | | | | | | | | | |
| | A3 | A4 | Y | M | C | K | Y | M | C | LM | LC | DY | K |
| LP9600 A3 MONOCHROME LASER | ○ | | | | | ○ | | | | | | | |
| LP9500C A3 COLOR LASER | ○ | ○ | ○ | ○ | ○ | ○ | | | | | | | |
| LP1900C A4 COLOR LASER | | ○ | ○ | ○ | ○ | ○ | | | | | | | |
| PM900C INK JET | | ○ | | | | | ○ | ○ | ○ | ○ | ○ | ○ | ○ |
| MJ900C INK JET | | ○ | | | | | ○ | ○ | ○ | | | | ○ |
| ... | | | | | | | | | | | | | |

| | T10 | T12 | T14 | T16 PAPER REMAINING AMOUNT | | T18 TONER REMAINING AMOUNT | | | | T20 LS10 INK REMAINING AMOUNT | | | | | | | T22 |
|---|---|---|---|---|---|---|---|---|---|---|---|---|---|---|---|---|---|
| LAST MONITORING | MODEL NAME | SERIAL NUMBER | | A3 | A4 | Y | M | C | K | Y | M | C | LM | LC | DY | K | ACQUISITION TIME |
| | LP9600 A3 MONOCHROME LASER | ABC 0001 | | ○ | ○ | | | | | | | | | | | | 20:00, NOVEMBER 10, 2003 |
| ○ | LP9500C A3 COLOR LASER | ABC 1111 | | ○ | ○ | ○ | ○ | ○ | ○ | | | | | | | | 3:00, OCTOBER 15, 2003 |
| | LP1900C A4 COLOR LASER | ABC 2222 | | | ○ | ○ | ○ | ○ | ○ | | | | | | | | 14:00, NOVEMBER 2, 2003 |
| | PM900C INK JET | XYZ 3333 | | | ○ | | | | | ○ | ○ | | ○ | ○ | ○ | ○ | 9:15, SEPTEMBER 29, 2003 |
| | MJ900C INK JET | XYZ 4444 | | | ○ | | | | | ○ | ○ | ○ | | | | ○ | 8:26, AUGUST 11, 2003 |

NETWORK DEVICE AND DEVICE MONITORING METHOD

CROSS REFERENCE TO RELATED APPLICATION

This application claims benefit of priority under 35 U.S.C.§119 to Japanese Patent Application No. 2003-402735, filed on Dec. 2, 2003, the entire contents of which are incorporated by reference herein.

BACKGROUND OF THE INVENTION

1. Field of the Invention

The present invention relates to a network device and a device monitoring method, and particularly relates to a network device which automatically identifies an object to be monitored and acquires monitored items from a server and a device monitoring method therewith.

2. Description of the Related Art

There exists a connection mode in which a device (for example, a printer) is connected to a network via a versatile network device (for example, a network board). In this case, an agent which monitors the printer is located on the network board and cannot specify what model of printer the network board is connected to until the next power-on. Therefore, at present, DIP switches are provided on the network board, and a user performs DIP switch settings which are previously determined according to a model of a connected printer.

However, the DIP switch settings are a burdensome work for the user. Especially when some network board is shifted from one printer to another printer, DIP switch settings need to be performed every time the network board is shifted, and the work load thereof is very large. Moreover, if the DIP switch settings are different, a situation in which the printer cannot be properly connected to the network occurs.

SUMMARY OF THE INVENTION

Hence, the present invention is made in view of the aforementioned problem, and an object of the present invention is to provide a network device such as a network board which holds monitored items on a device-by-device basis, automatically monitors an object to be monitored, and monitors a device based on the held monitored items.

In order to accomplish the aforementioned and other objects, according to one aspect of the present invention, a network device connected between a device and a network, comprises:

- a monitored item holder which holds monitored items that are items to be monitored by the network device on a device-by-device basis;
- a device specifier which specifies a device to which the network device is connected;
- a monitored item acquisition which acquires monitored items of the device specified by the device specifier from the monitored item holder; and
- a device monitor which monitors the connected device in accordance with the monitored items acquired by the monitored item acquisition.

According to another aspect of the present invention, a device monitoring method of monitoring a device by a network device between the device and a network, comprises the steps of:

- specifying a device to which the network device is connected;
- acquiring monitored items of the specified device from a monitored item holder which holds monitored items that are items to be monitored on a device-by-device basis; and
- monitoring the connected monitor in accordance with the acquired monitored items.

BRIEF DESCRIPTION OF THE DRAWINGS

FIG. 4 is a diagram showing an example of the structure of a connected printer list according to the first embodiment;

FIG. 7 is a diagram showing an example of the structure of a monitored item list held by the server according to the first embodiment;

FIG. 10 is a diagram showing an example of the structure of a connected printer list according to the second embodiment;

DETAILED DESCRIPTION OF THE EMBODIMENTS

First Embodiment

Figure 1:
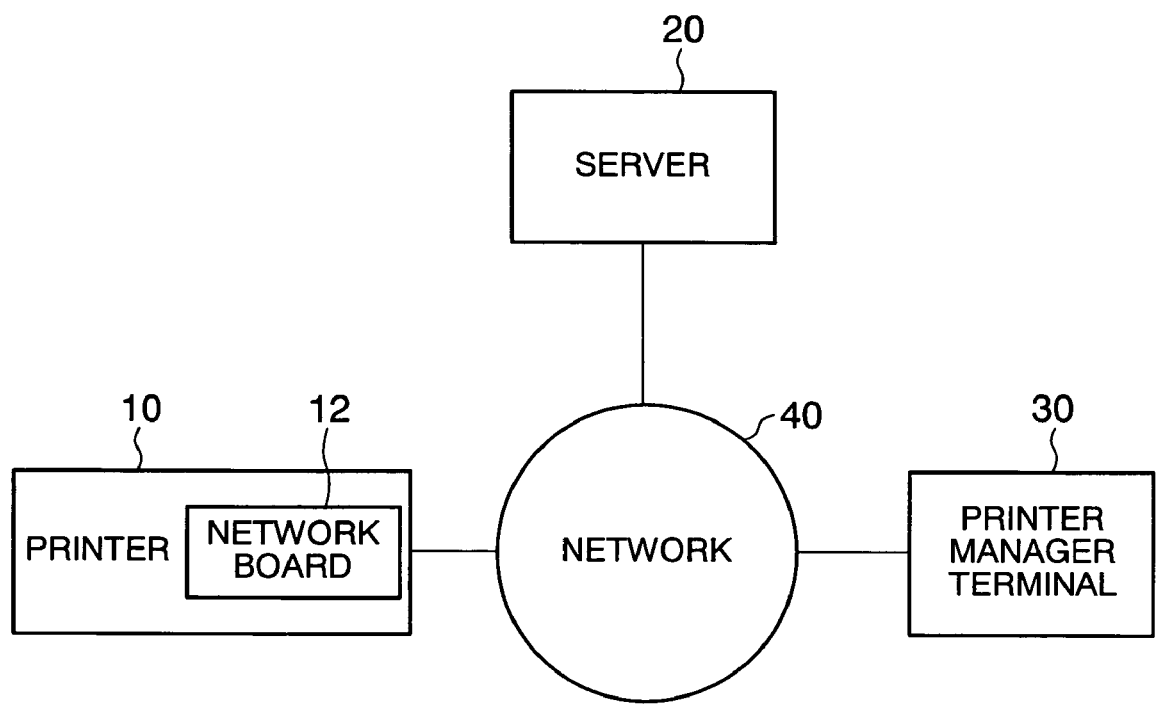
FIG. 1 is a block diagram showing the overall configuration of a print system according to a first embodiment.

FIG. 1 is a block diagram showing the overall configuration of a print system according to the first embodiment. As shown in FIG. 1, in the print system according to this embodiment, a printer 10, a server 20, and a printer manger terminal 30 are interconnected via a network 40.

This network 40 may be a public network such as the Internet using TCP/IP (transmission control protocol/internet protocol) or may be a LAN such as Ethernet (registered trademark).

In particular, in this embodiment, the printer 10 is connected to the network 40 via a network board 12. This network board 12 is an example of a network device, and the printer 10 is an example of a device connected to the network via the network board 12.

Print data transmitted from a print client (not shown) connected to the network 40 is received by the network board 12, and a print operation is executed based on this print data by the printer 10.

Figure 2:
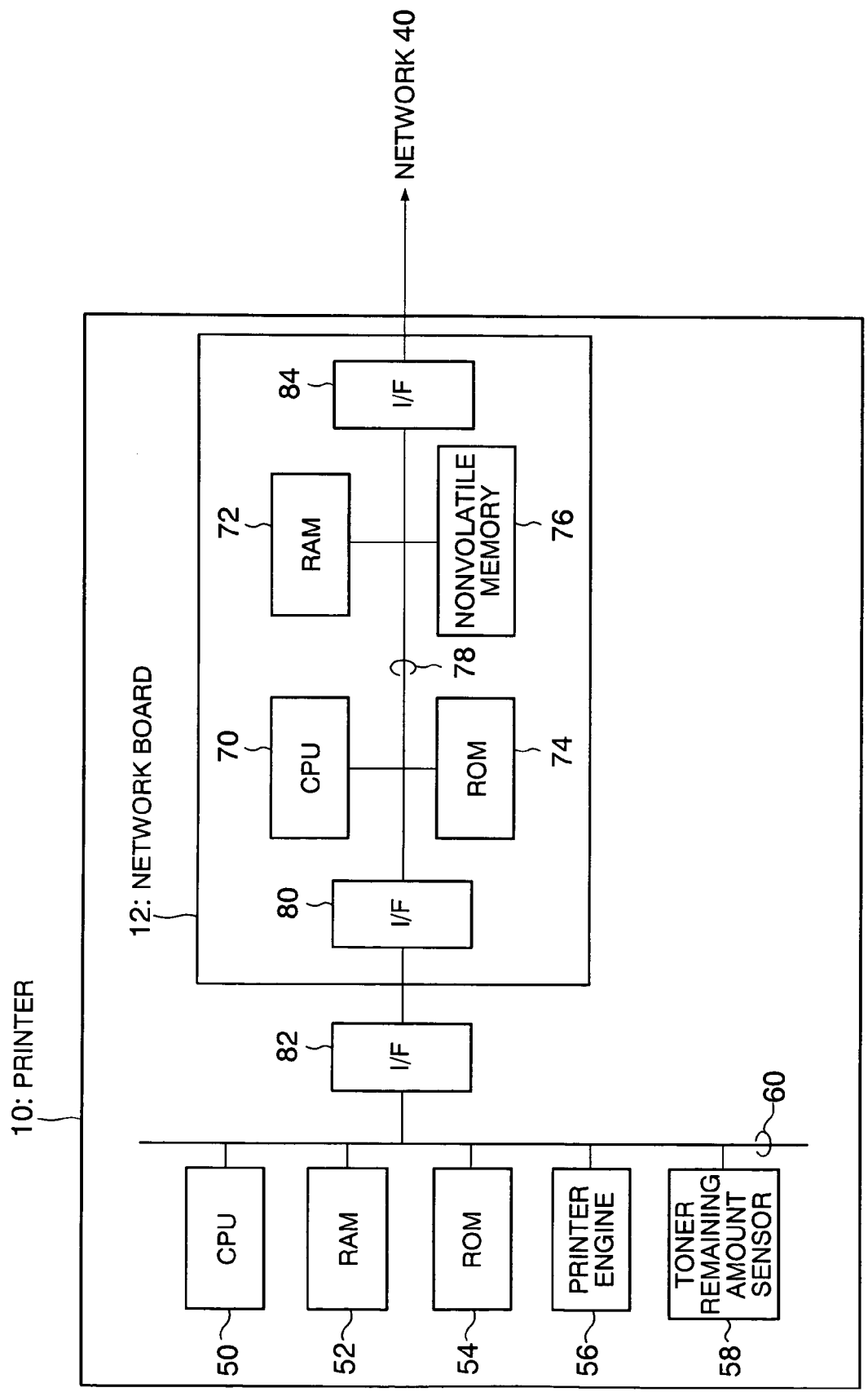
FIG. 2 is a block diagram showing the internal configurations of a printer and a network board in FIG. 1.

FIG. 2 is a block diagram showing the internal configurations of the printer 10 and the network board 12 according to this embodiment. As shown in FIG. 2, the printer 10 includes a CPU 50, a RAM (Random Access Memory) 52, a ROM (Read Only Memory) 54, a printer engine 56, and a toner remaining amount sensor 58, and they are connected to each other via an internal bus 60. As can be known from this configuration, the printer 10 according to this embodiment is a laser printer and includes the toner remaining amount sensor 58 to detect the remaining amount of toner consumed by the printer engine 56.

The network board 12 includes a CPU 70, a RAM 72, a ROM 74, and a nonvolatile memory 76, and they are connected to each other by an internal bus 78. The nonvolatile memory 76 is a rewritable memory in which memory contents are held even if the printer 10 is powered off, and, for example, constituted by an EEPROM or a hard disk.

An interface 80 is connected to the internal bus 78. The network board 12 is connected to an interface 82, which is connected to the internal bus 60, via the interface 80. The interface 84 is also connected to the internal bus 78, and the network board 12 is connected to the network 40 via this interface 84.

Figure 3:
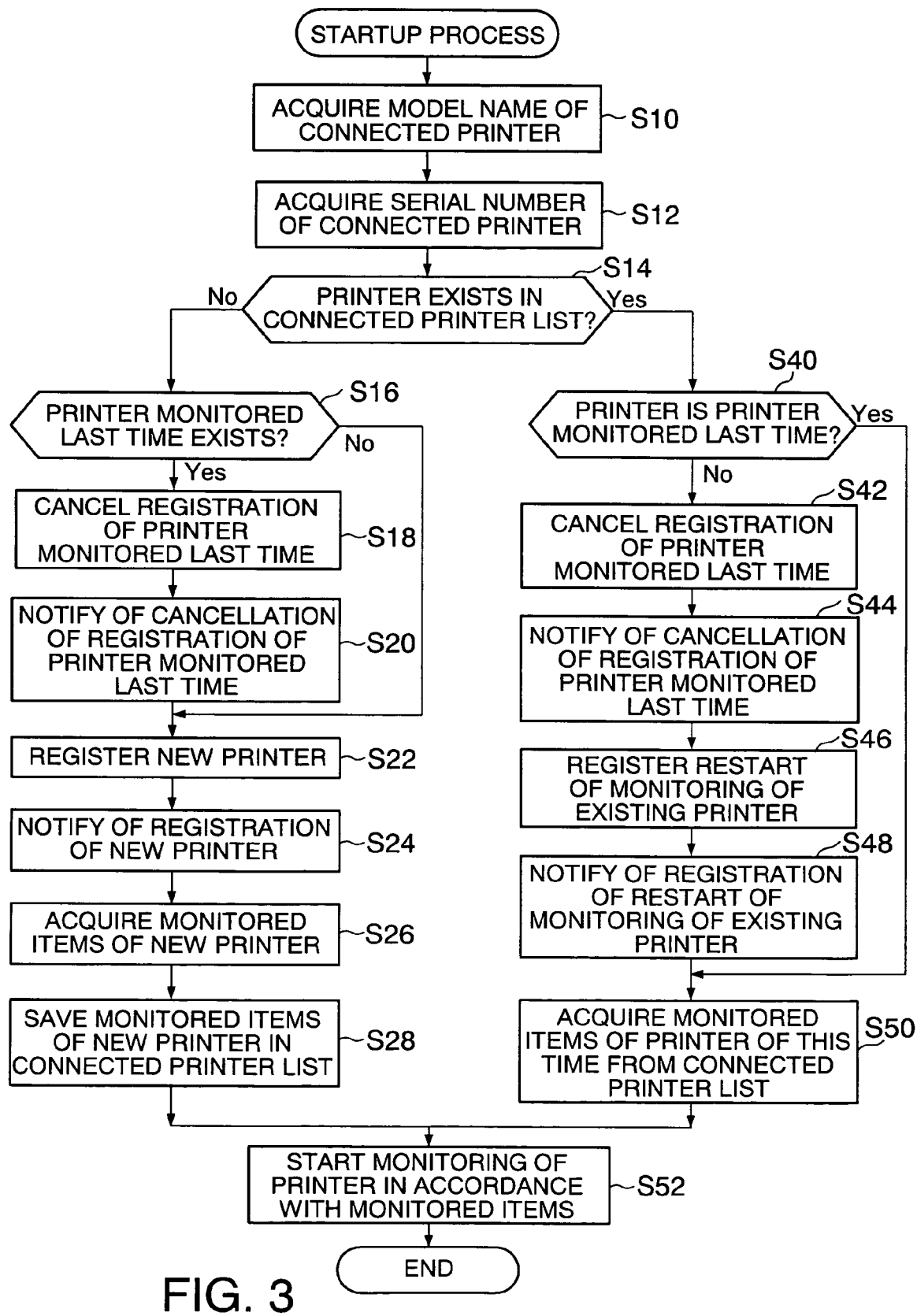
FIG. 3 is a flowchart explaining the contents of a startup process executed by the network board according to the first embodiment.

FIG. 3 is a flowchart explaining the contents of a startup process executed by the network board 12. This startup process is started when the network board 12 is powered on, that is, when the printer 10 is powered on. This startup process is realized by making the CPU 70 read and execute a startup program stored in the ROM 74 or the nonvolatile memory 76.

As shown in FIG. 3, the network board 12 acquires a model name of the printer 10 to which the network board 12 itself is connected from the printer 10 (step S10). This model name is identification information assigned to each printer model. Subsequently, the network board 12 acquires a serial number of the printer 10 to which the network board 12 itself is connected (step S12). This serial number is identification information uniquely assigned to each printer.

Then, the network board 12 judges whether this printer 10 exists in a connected printer list (step S14). FIG. 4 is a diagram showing an example of the structure of a connected printer list LS10 in this embodiment. In this embodiment, this connected printer list LS10 is stored in the nonvolatile memory 76. Namely, the connected printer list LS10 is held in a nonvolatile manner even if the printer 10 is powered off.

As shown in FIG. 4, the connected printer list LS10 includes, as data items, last monitoring T10, a model name T12, a serial number T14, a paper remaining amount T16, a toner remaining amount T18, and an ink remaining amount T20.

In the last monitoring T10, information to specify a printer monitored last time by the network board 12 is stored. In the model name 12, the model name of the printer acquired in step S10 is stored. In the serial number T14, the serial number of the printer acquired in step S12 is stored.

The paper remaining amount T16 is separated into items of A3 and A4, and information specifying whether each of them is included in an object to be monitored is stored therein. The toner remaining amount T18 is separated into items of yellow (Y), magenta (M), cyan (C), and black (K), and information specifying whether each of them is included in the object to be monitored is stored therein. The ink remaining amount T20 is separated into items of yellow (Y), magenta (M), cyan (C), light magenta (LM), light cyan (LC), dark yellow (DY), and black (K), and information specifying whether each of them is included in the object to be monitored is stored.

In step S14 in FIG. 3, the network board 12 specifies a printer to which the network board 12 is connected from the model name and the serial number of the printer 10, and judges whether the printer 10 is included in the connected printer list LS10 by comparing these model name and serial number with the model name T12 and the serial number T14 of the connected printer list LS10.

When the printer 10 connected to the network board 12 does not exist in the connected printer list LS10 (step S14: No), the network board 12 judges whether a printer monitored last time exists in the connected printer list LS10 (step S16). More specifically, the network board 12 judges whether a flag is set in any one last monitoring T10 of the connected printer list LS10.

Whether the printer monitored last time exists in the connected printer list LS10 (step S16: Yes), the registration of the printer monitored last time is canceled (step S18). More specifically, the flag stored in the last monitoring T10 of the connected printer list LS10 is cleared. Subsequently, the network board 12 notifies the server 20 of the cancellation of the registration of the printer monitored last time (step S20). In this embodiment, a unique serial number is also assigned to the network board 12. Therefore, in step S20, the network board 12 notifies the server 20 of not only this serial number as information to specify the network board 12 but also the serial number of the printer as information to specify the printer monitored last time.

After this process in step S20 or when it is judged in step S16 that the printer monitored last time does not exist in the connected printer list LS10 (step S16: No), the printer 10 of this time is registered as a new printer in the connected printer list LS 10 (step S22). More specifically, the model name and the serial number of the printer 10 are registered in the model name T12 and the serial number T14 of the connected printer list LS10, and a flag of the corresponding last monitoring T10 is set. Then, the network board 12 notifies the server 20 of the registration of the new printer (step S24). Also in step S24, the network board 12 notifies the server 20 of the serial number of the network board 12 and the serial number of the new printer 10 as information to specify the network board 12 and the printer 10.

Then, the network board 12 acquires monitored items of the new printer from the server 20 (step S26). Namely, items to be monitored of printers differ from one printer model to another, and hence, the network board 12 transmits a request for acquisition of monitored items of the corresponding printer and acquires the monitored items from the server 20.

Thereafter, the network board 12 saves the monitored items acquired in step S26 in the connected printer list LS10 (step S28). More specifically, flags of the items to be monitored out of the paper remaining amount T16, the toner remaining amount T18, and the ink remaining amount T20 of the connected printer list LS10 are set.

On the other hand, when judging in step S14 that the printer 10 to which the network board 12 is connected exists in the connected printer list LS10 (step S14: Yes), the network board 12 judges whether the printer 10 connected this time is a printer monitored last time (step S40). More specifically, the network board 12 judges whether the model name T12 and the serial number T14 of the printer whose flag is set in the last monitoring T10 of the connected printer list LS10 are the same as the model name and the serial number acquired in step S10 and step S12.

When the printer 10 is different from the printer monitored last time (step S40: No), the registration of the printer monitored last time is canceled from the connected printer list LS10 (step S42). More specifically, the flag stored in the last monitoring T10 of the connected printer list LS10 is cleared. Subsequently, the network board 12 notifies the server 20 of the cancellation of the registration of the printer monitored last time (step S44). Also in step S44, the network board 12 notifies the server 20 of the serial number of the network board 12 and the serial number of the printer monitored last time as information to specify the network board 12 and the printer.

Then, the network board 12 registers a restart of monitoring of an existing printer in the connected printer list LS10 (step S46). To be more specific, this printer 10 exists in the connected printer list LS10, and hence a flag of the last monitoring T10 of the printer 10 is set. Subsequently, the network board 12 notifies the server 20 of the registration of the restart of monitoring of the existing printer (step S48). Also in step S48, the network board 12 notifies the server 20 of the serial number of the network board 12 and the serial number of the existing printer 10 as information to specify the network board 12 and the existing printer 10.

After this process in step S48 or when it is judged in step S40 that the printer 10 connected this time is the same as the printer monitored last time (step S40: Yes), monitored items of the printer of this time are acquired from the connected printer list LS10 (step S50).

After the process in step S50 or after the process in step S28, the network board 12 starts monitoring of the printer 10 in accordance with the acquired monitored items (step S52).

Figure 5:
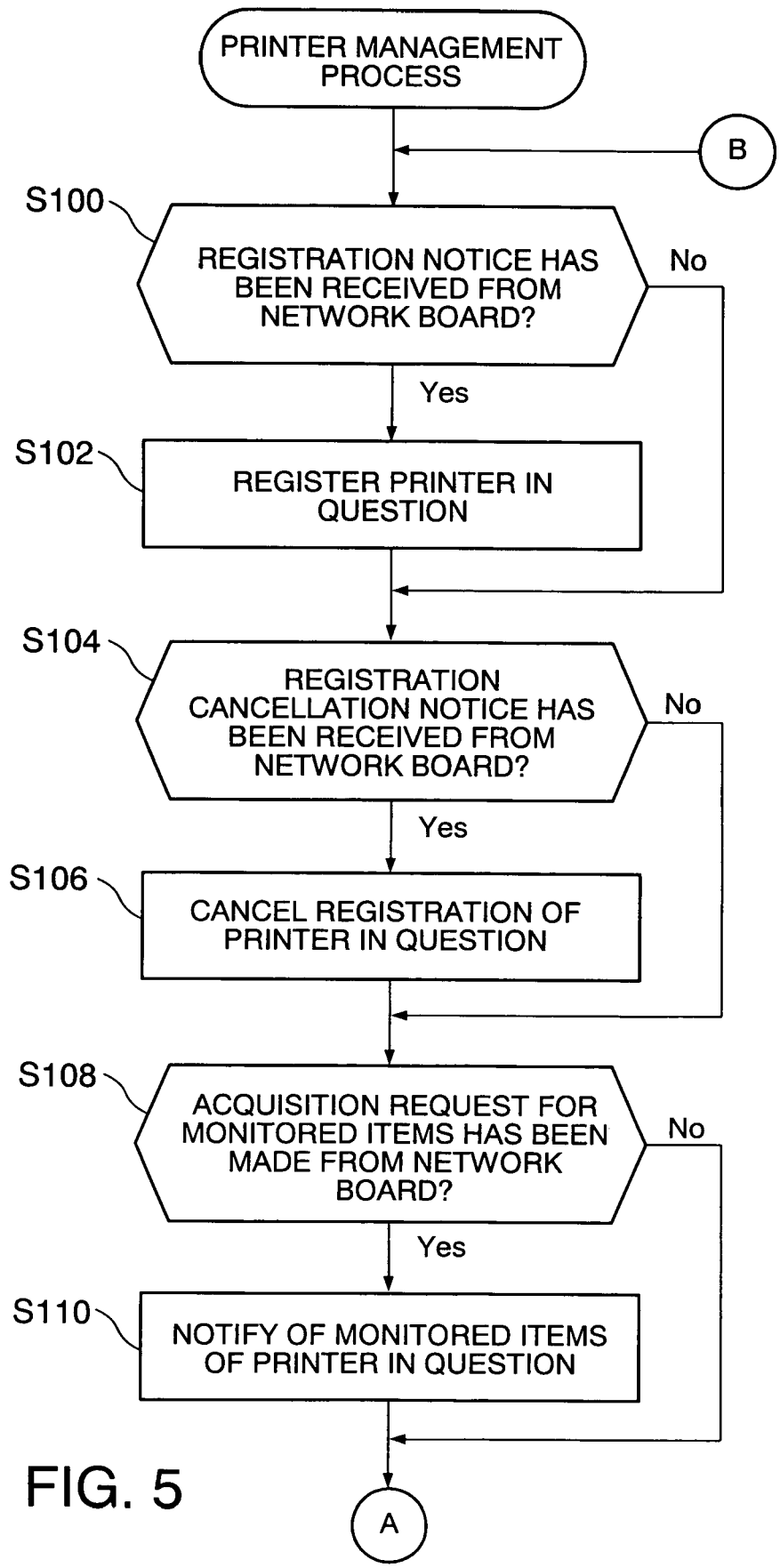
FIG. 5 is a flowchart explaining the contents of a printer management process executed by a server according to the first embodiment (First part)
Figure 6:
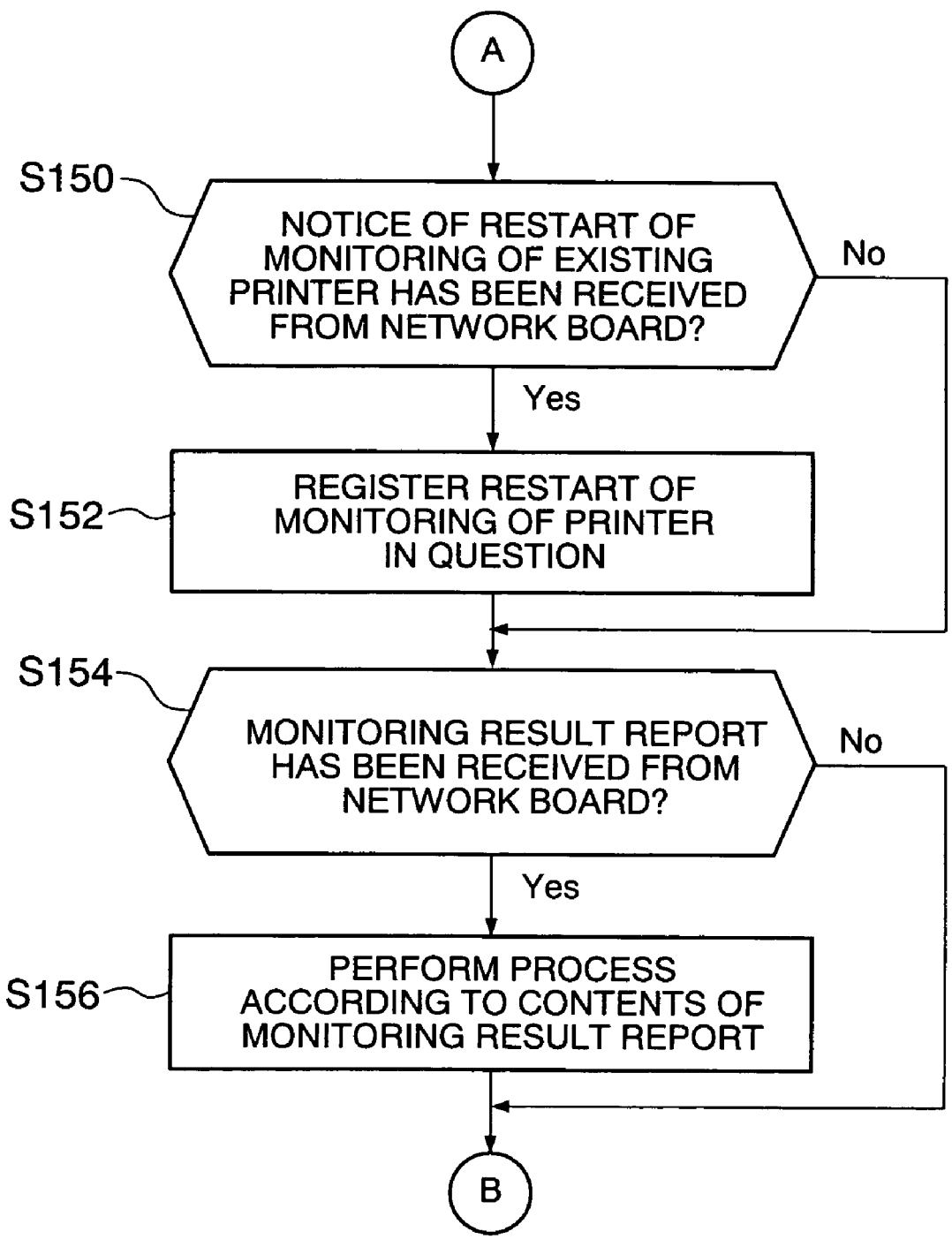
FIG. 6 is a flowchart explaining the contents of the printer management process executed by the server according to the first embodiment (Second part)

FIG. 5 and FIG. 6 are flowcharts explaining the contents of a printer management process executed by the server 20. As shown in FIG. 5, the server 20 first judges whether a notice of registration of a new printer has been received from the network board 12 (step S100). This printer registration notice is transmitted in step S24 of the aforementioned startup process.

When the notice of registration of the new printer has been received from the network board 12 (step S100: Yes), the server 20 registers this printer in a management list of the server 20 based on the fact that the printer is connected to the network board 12 (step S102). More specifically, since the server 20 is notified of the serial number of the network board 12 and the serial number of the printer 10, based on these serial numbers, the server 20 registers the printer 10 corresponding to the network board 12 in the management list. When the printer registration notice has not been received (step S100: No), the process in step S102 is skipped.

Then, the server 20 judges whether a notice of cancellation of printer registration has been received from the network board 12 (step S104). This registration cancellation notice is transmitted in step S20 and S42 of the aforementioned startup process.

When the printer registration cancellation notice has been received from the network board 12 (step S104: Yes), the server 20 cancels the registration of the printer registered in the management list of the server 20 based on the fact that the printer is connected to the network board 12 (step S106). More specifically, since the server 20 is notified of the serial number of the network board 12 and the serial number of the printer 10, based on these serial numbers, the server 20 cancels the registration of the printer 10 corresponding to the network board 12 registered in the management list. When the printer registration cancellation notice has not been received (step S104: No), the process in step S106 is skipped.

Thereafter, the server 20 judges whether an acquisition request for monitored items of the printer has been made from the network board 12 (step S108). This acquisition request for monitored items is transmitted in step S26 of the aforementioned startup process.

When the acquisition request for monitored items has been made from the network board 12 (step S108: Yes), the server 20 notifies the network board 12 of the monitored items of the printer to be monitored (step S110). More specifically, since the server 20 is notified of the serial number of the network board 12 and the serial number of the printer 10, based on these serial numbers, the server 20 specifies a model of the printer connected to the network board 12. The server 20 grasps items to be monitored as a monitored item list on a printer model by printer model basis, and transmits monitored items corresponding to the model of the printer which the server 20 is notified of by the network board 12 to the network board 12. On the other hand, when the acquisition request for monitored items has not been made (step S108: No), this process in step S110 is skipped.

Then, as shown in FIG. 6, the server 20 judges whether a notice of the restart of monitoring of the existing printer has been received from the network board 12 (step S150). This notice of the restart of monitoring of the existing printer is transmitted in step S48 of the aforementioned startup process.

When the notice of the restart of monitoring of the existing printer has been received from the network board 12 (step S150: Yes), the server 20 registers the restart of monitoring of this printer in the management list, considering the fact that the printer is connected to the network board 12 (step S152). More specifically, since the server 20 is notified of the serial number of the network board 12 and the serial number of the printer 10, based on these serial numbers, the server 20 registers the printer corresponding to the network board 12 in the management list. When the notice of the restart of monitoring of the existing printer has not been received (step S150: No), this process in step S152 is skipped.

Thereafter, the server 20 judges whether a monitoring result report has been received from the network board 12 (step S154). This monitoring result report is transmitted in step S52 of the aforementioned startup process. Namely, the network board 12 transmits the contents of data items under monitoring to the server 20 periodically (for example, every thirty minutes). For example, when the printer 10 connected to the network board 12 is LP9500C, the network board 12 monitors the paper remaining amount T16 of each of A3 and A4, the toner remaining amount T18 of each of yellow (Y), magenta (M), cyan (C), and black (K), and the monitoring result is periodically transmitted as the monitoring result report to the server 20.

When the monitoring result report has been received from the network board 12 (step S154: Yes), the server 20 performs a process according to the contents of the monitoring result report (step S156). When the monitoring result report has not been received (step S154: No), this process in step S156 is skipped.

After the process in step S156, the server 20 returns to the aforementioned process in step S100.

FIG. 7 is a diagram showing an example of the structure of a monitored item list LS 20 which is referred to in step S110 of the printer management process. As shown in FIG. 7, the monitored item list LS20 holds items to be monitored on a printer model by printer model basis in an at-a-glance form. More specifically, the monitored item list LS20 includes, as data items, a model name T30, a paper remaining amount T32, a toner remaining amount T34, and an ink remaining amount T36. These respective data items correspond to respective data items of the connected printer list LS10. Accordingly, if monitored items are registered in the monitored item list LS20 in the server 20 when a new model printer appears on the market, the network board 12 automatically acquires necessary monitored items from the server 20 without users themselves changing the setting of the network board 12.

Figure 8:
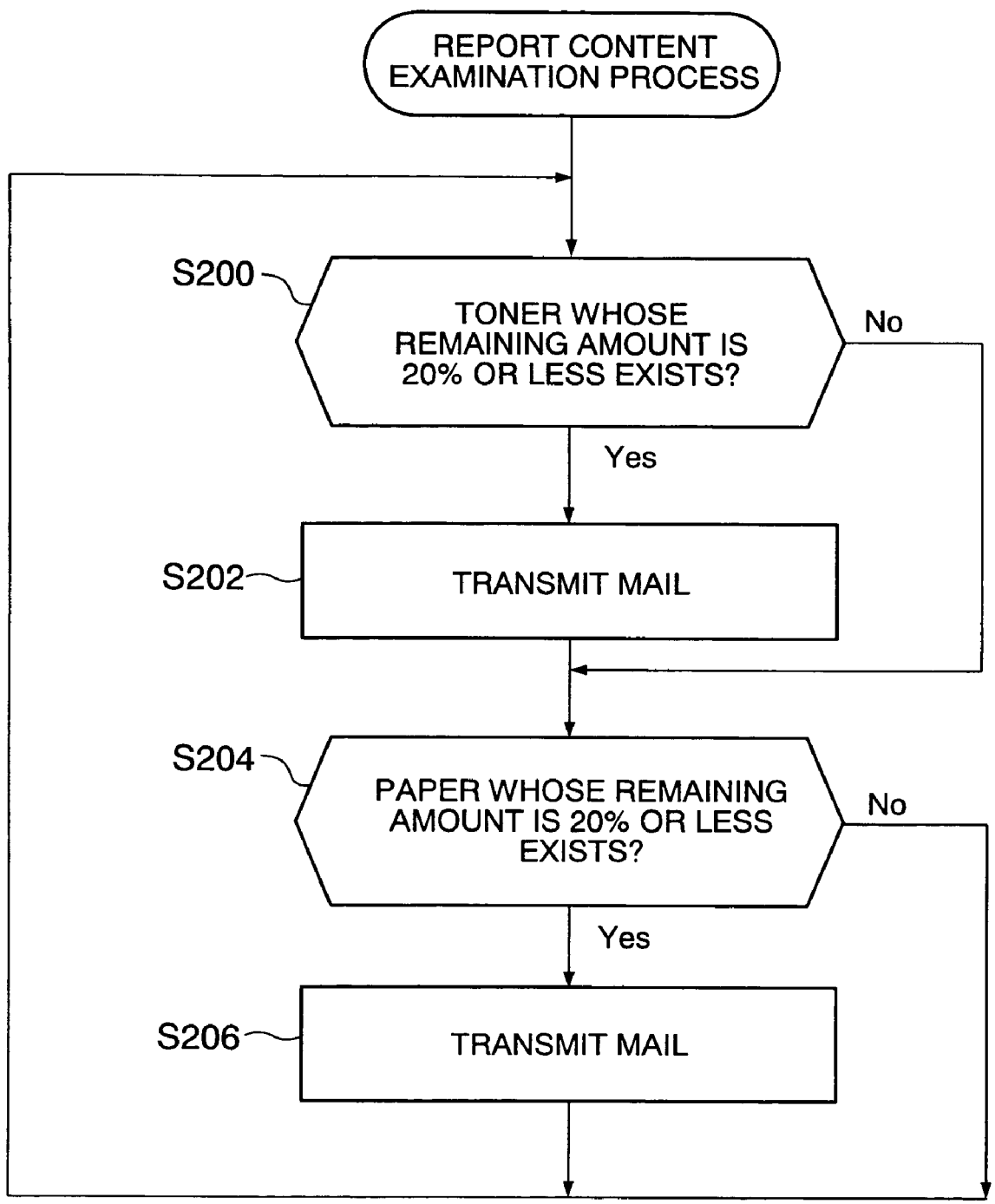
FIG. 8 is a flowchart explaining the contents of a report content examination process executed by the server according to the first embodiment.

FIG. 8 is a flowchart explaining a report content examination process executed by the server 20. This report content examination process shows one of processes executed in step 5156 of the printer management process as an example. This report content examination process is executed regularly by the server 20.

As shown in FIG. 8, the server 20 judges whether the toner remaining amount T18 of the printer in the monitoring result report is 20% or less (step 5200). In this embodiment, the toner remaining amount T18 is monitored on a color-by-color basis, and hence even if the remaining amount of only one color is 20% or less, the toner remaining amount T18 is judged to be 20% or less.

When the toner remaining amount T18 is 20% or less (step S200: Yes), e-mail to the effect that the toner remaining amount T18 is 20% or less is transmitted to a mail address of a printer manager which is previously registered (step S202). The printer manager can look at the transmitted e-mail through the printer manager terminal 30. On the other hand, when the toner remaining amount T18 is not 20% or less (step S200: No), the process in step S202 is skipped.

Then, the server 20 judges whether the paper remaining amount T16 is 20% or less (step S204). In this embodiment, the paper remaining amount T16 is monitored on a paper size by paper size basis, and hence even if the remaining amount of only one paper size is 20% or less, the paper remaining amount T16 is judged to be 20% or less.

When the paper remaining amount T16 is 20% or less (step S204: Yes), e-mail to the effect that the paper remaining amount T16 is 20% or less is transmitted to the mail address of the printer manager which is previously registered (step S206). The printer manager can look at the transmitted e-mail through the printer manager terminal 30. On the other hand, when the paper remaining amount T16 is not 20% or less (step S204: No), the process in step S206 is skipped. Then, the server 20 repeats the aforementioned process from step S200.

As described above, according to the print system of this embodiment, it is possible to connect the network board 12 to any printer and automatically place the printer under monitoring. On this occasion, the network board 12 need not grasp monitored items of each printer and can automatically acquire the monitored items from the server 20. Besides, it becomes unnecessary for the users themselves to change the setting of the network board 12 depending on the model of each printer.

Moreover, new model printers shipped after the network board 12 is manufactured can also be monitored by the same network board 12. Hence, user friendliness greatly improves.

Additionally, even in the case of the already shipped printers, items to be monitored by the network board 12 are sometimes added and changed, but even in such a case, by only changing the monitored items of the monitored item list LS 20 of the server 20, the change of each printer can be automatically performed when the user shifts the network board 12.

Further, in the network board 12, monitored items of printers which have been monitored before are also held as the connected printer list LS10, whereby when the network board 12 is connected again to the printer which has been monitored before by the network board 12 itself, the network board 12 can acquire the monitored items without accessing the server 20.

Furthermore, the network board 12 not only automatically notifies the server 20 of the cancellation of the registration of a printer monitored last time but also automatically notifies the server 20 of the registration of a newly connected printer. Therefore, printer registration and cancellation in the server 20 can be automatically performed.

Moreover, when a printer is the same printer as monitored last time, the network board 12 can place the so far monitored items under monitoring as they are.

Second Embodiment

In the second embodiment, the aforementioned first embodiment is modified, and even if a printer connected this time exists in the connected printer list LS10 of the network board 12, monitored items are acquired again from the server 20 when a predetermined period of time has passed since the monitored items were acquired from the server 20. A more detailed explanation will be given below.

Figure 9:
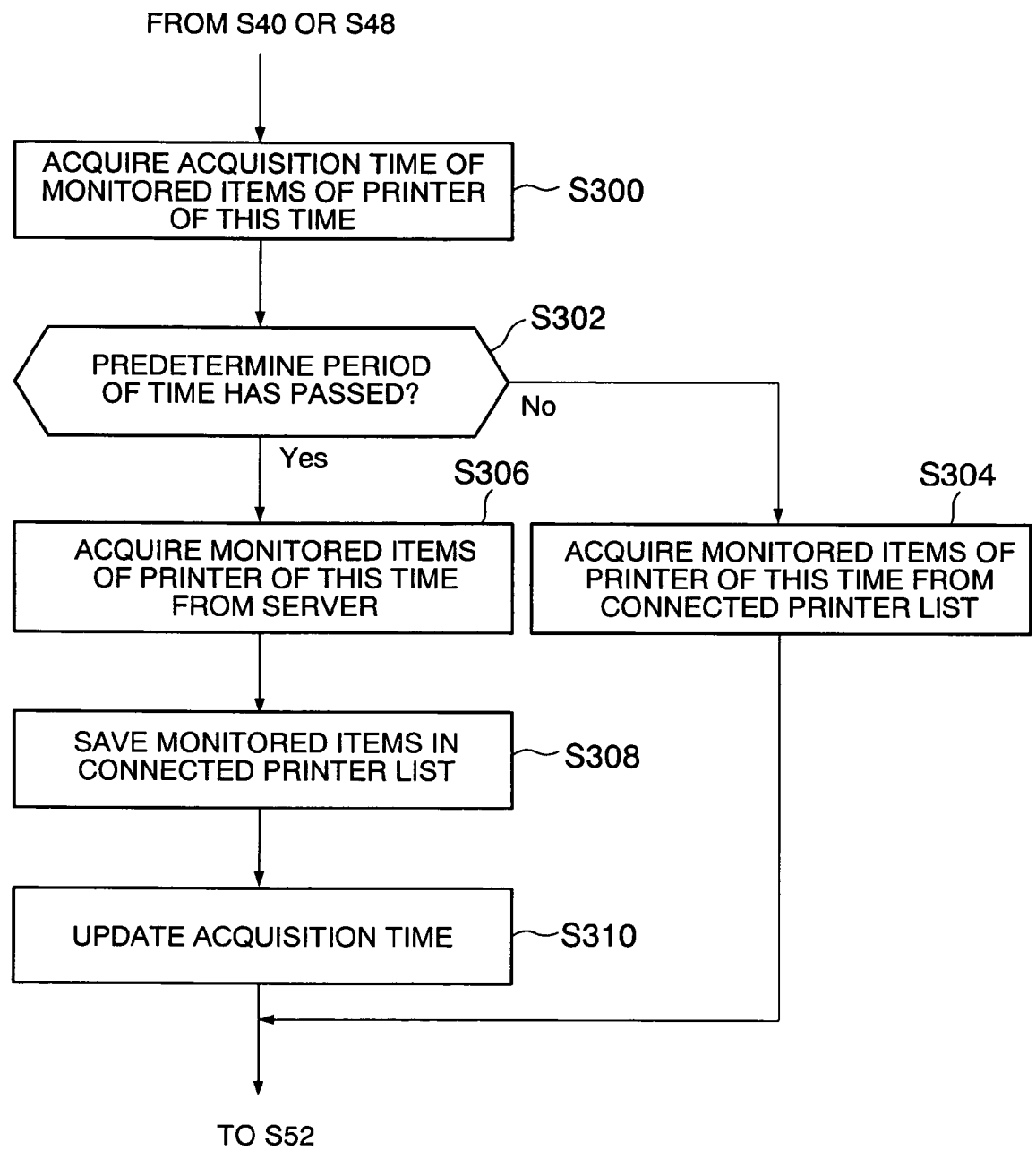
FIG. 9 is a flowchart explaining the contents of a startup process executed by a network board according to a second embodiment.

FIG. 9 is a flowchart partially showing the contents of a startup process executed in the network board 12 according to this embodiment. As shown in FIG. 9, after step S40 or step S48 of the startup process in the first embodiment, the network board 12 acquires an acquisition time of the monitored items of the printer connected this time from the connected printer list LS10 (step S300). This acquisition time is information specifying a time when the monitored items were acquired from the server 20.

FIG. 10 is a diagram showing an example of the structure of the connected printer list LS10 according to this embodiment. As shown in FIG. 10, in the connected printer list LS10 according to this embodiment, an acquisition time T22 is added as an data item to each printer. This acquisition time T22 shows a time when the monitored items of the corresponding printer were last acquired from the server 20.

Next, as shown in FIG. 9, the network board 12 judges whether a predetermined period of time has passed by comparing the time acquired from the acquisition time T22 and a present time (step S302). The predetermined period of time is, for example, one month, one week, or the like.

When the predetermined period of time has not passed (step S302: No), the network board 12 acquires the monitored items of the printer of this time from the connected printer list LS10 (step S304). Then, the network board 12 goes to the process in step S52.

On the other hand, when the predetermined period of time has passed (step S302: Yes), the network board 12 acquires the monitored items of the printer of this time again from the server 20 (step S306). Subsequently, the network board 12 stores and saves the acquired monitored items in the connected printer list LS10 (step S308).

Then, the network board 12 updates the acquisition time T22 of the connected printer list LS10 to the present time (step S310). Incidentally, the present time may be specified based on a clock of the network board 12 or the printer 10, or may be acquired together with the monitored items from the server 20. After this process in step S310, the network board 12 goes to the process in step S52.

As described above, according to the print system of this embodiment, when the predetermined time has passed since information on monitored items was acquired, the information on monitored items is acquired again from the server 20, so that the network board 12 can automatically cope with an addition to and a change of the monitored items.

Third Embodiment

In the third embodiment, the aforementioned first embodiment or second embodiment is modified, and also after the printer 10 boors up, monitored items of the printer are periodically acquired from the server 20. Namely, the third embodiment can be applied to the aforementioned first embodiment and also can be applied to the second embodiment.

Figure 11:
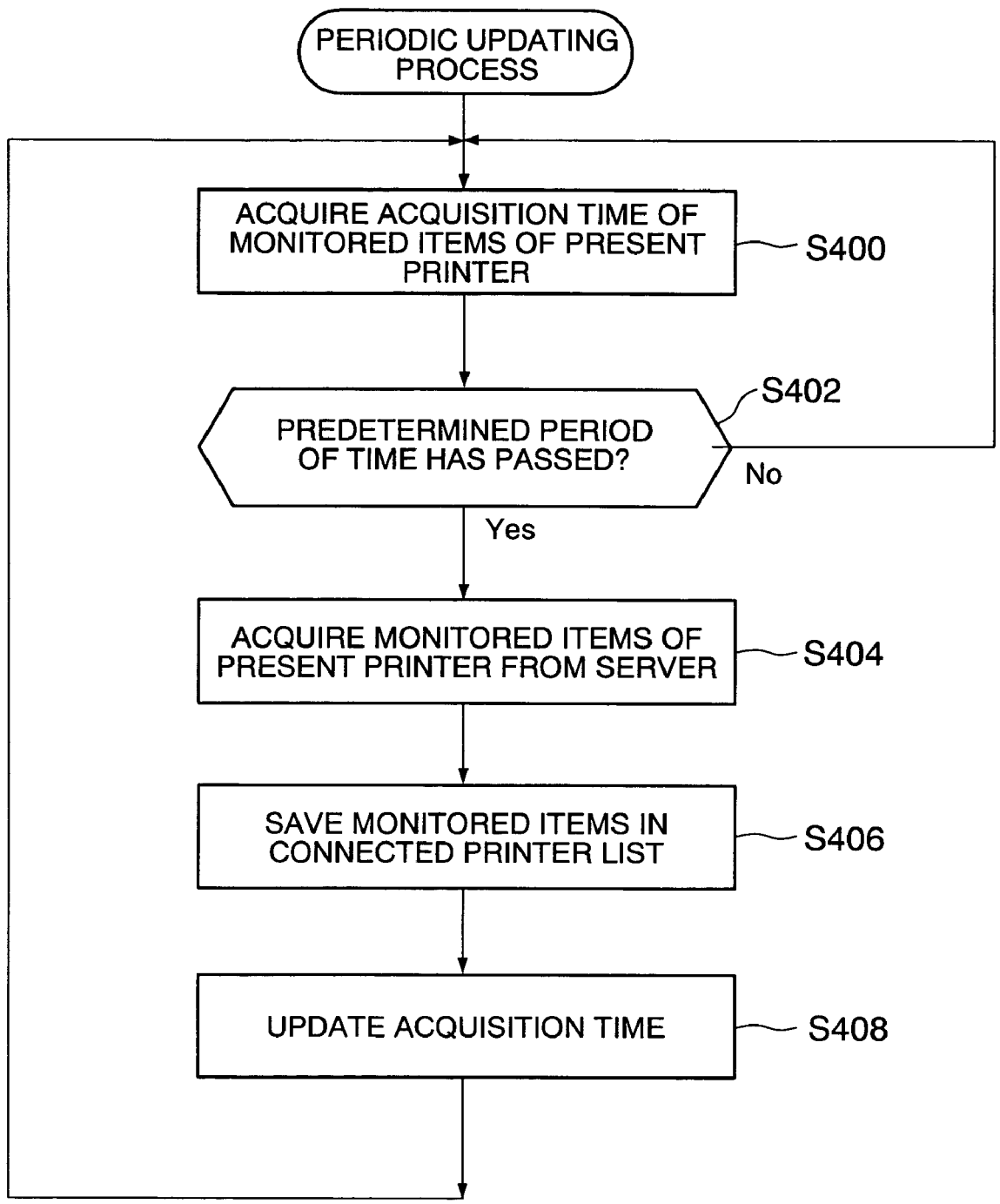
FIG. 11 is a flowchart explaining the contents of a periodic updating process executed by a network board according to a third embodiment.

FIG. 11 is a flowchart explaining a periodic updating process executed by the network board 12 according to this embodiment. This periodic updating process is realized by making the CPU 70 read and execute a periodic updating program stored in the ROM 74 or the nonvolatile memory 76. Moreover, this periodic updating process is executed periodically at predetermined time intervals.

As shown in FIG. 11, the network board 12 acquires the acquisition time T22 of monitored items of a printer connected at present from the connected printer list LS 10 (step S400). This acquisition time is information which specifies a time when the monitored items were acquired from the server 20. The structure of the connected printer list LS10 according to this embodiment is the same as that described in FIG. 10.

Then, the network board 12 judges whether a predetermined period of time has passed by comparing the time acquired from the acquisition time T22 and a present time (step S402). The predetermined period of time is, for example, one month, one week, 24 hours, or the like.

When the predetermined period of time has not passed (step S402: No), the network board 12 returns to the aforementioned process in step S400.

On the other hand, when the predetermined period of time has passed (step S402: Yes), the network board 12 acquires the monitored items of the present printer again from the server 20 (step S404). Subsequently, the network board 12 stores and saves the acquired monitored items in the connected printer list LS10 (step S406).

Then, the network board 12 updates the acquisition time T22 of the connected printer list LS10 to the present time (step S408). Incidentally, the present time may be specified based on a clock of the network board 12 or the printer 10, or may be acquired together with the monitored items from the server 20. After this process in step S408, the network board 12 returns to the aforementioned process in step S400.

As described above, according to a print system of this embodiment, when the predetermined period of time has passed since information on monitored items was acquired even if the network board 12 is continuously powered on, the information on monitored items is acquired again from the server 20, so that the network board 12 can automatically cope with an addition to and a change of the monitored items.

Figure 12:
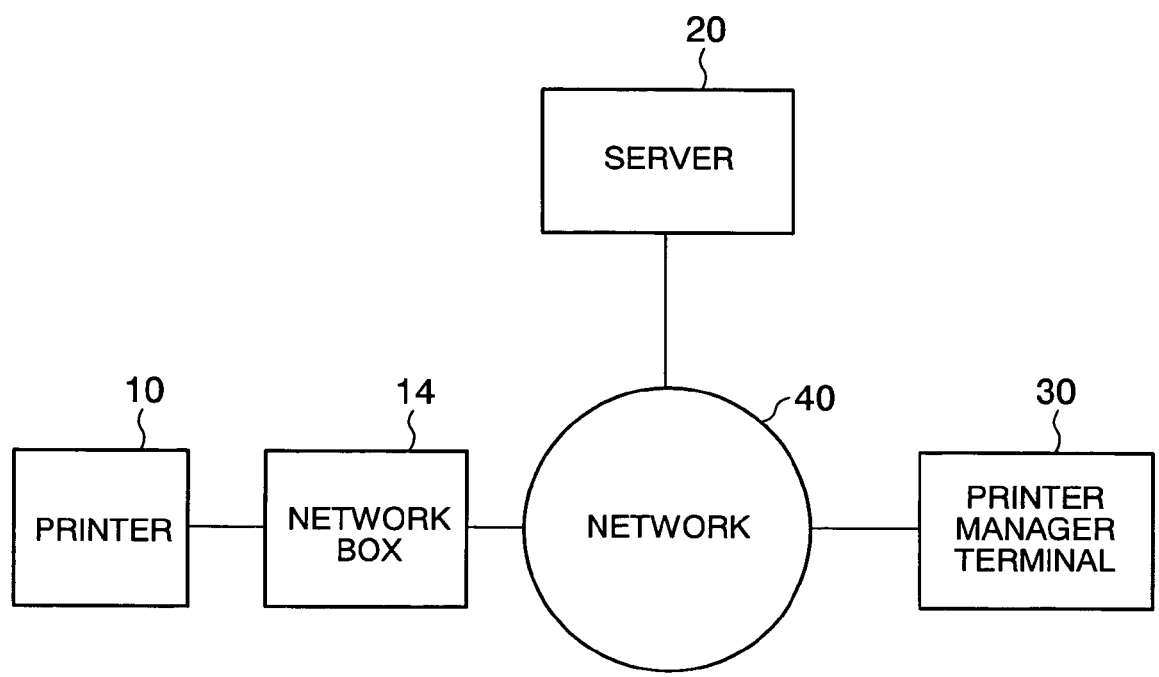
FIG. 12 is a block diagram showing a modification of the configuration of the print system.

It should be mentioned that the present invention is not limited to the aforementioned embodiments, and various changes may be made therein. For example, as shown in FIG. 12, the printer 10 may be connected to the network 40 via some other kind of network device such as a network box 14.

Moreover, in the aforementioned embodiments, the printer is shown as an example of a device to which the network device is connected, but the present invention is also applicable to a case where some other kind of device is connected to the network device.

Further, in the aforementioned embodiments, the network board 12 can hold monitored items on plural printers in the connected printer list LS10, but it may hold only monitored items on one printer. In this case, when a printer connected last time and a printer connected this time are different, monitored items are acquired from the server 20 each time.

Figure 13:
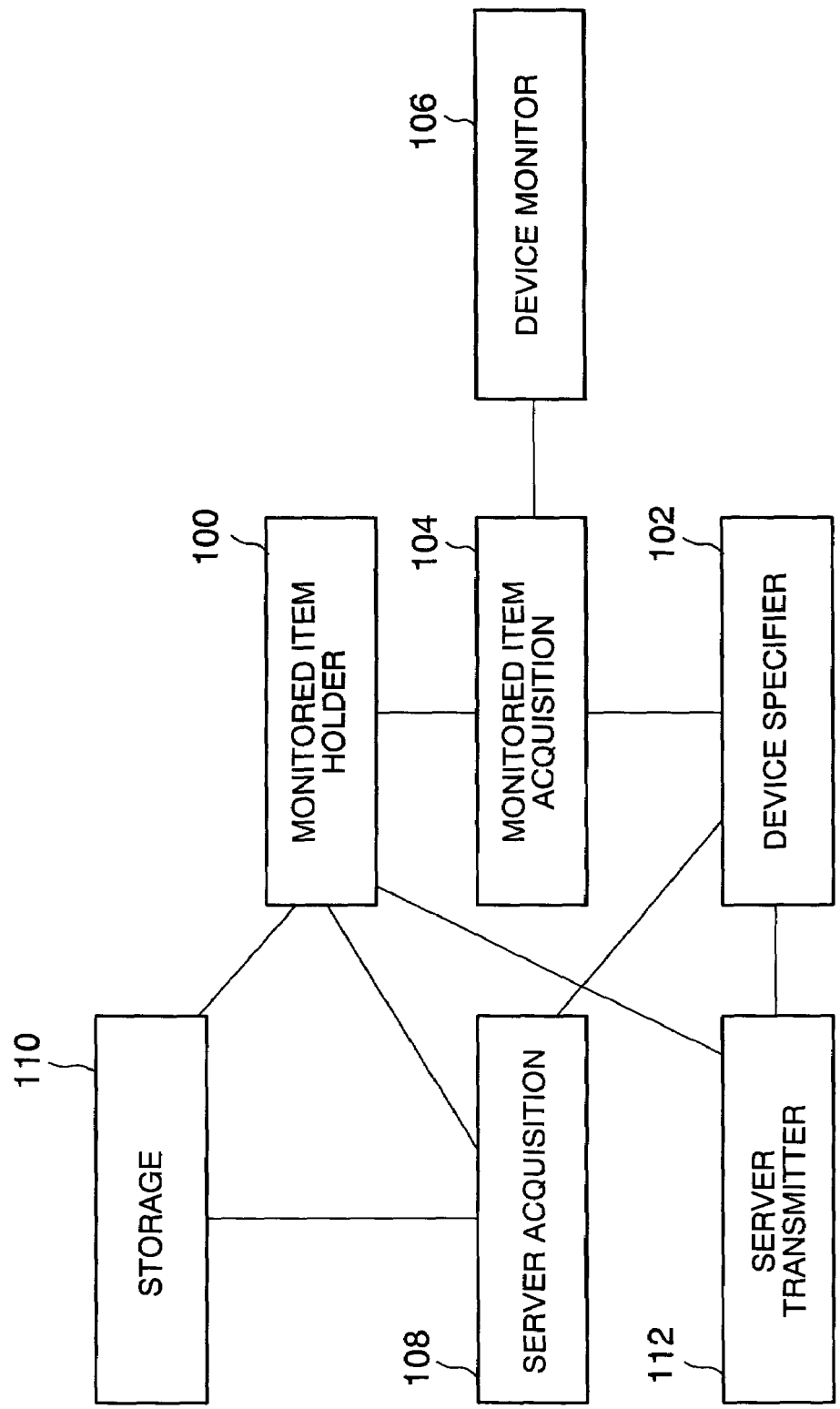
FIG. 13 is a diagram showing an example of the hardware configuration of a network device.

Furthermore, in the aforementioned embodiments, the case where the respective processes are realized by software is explained, but processes equal thereto can be also realized by hardware. FIG. 13 is a diagram showing an example of the configuration of a network device when the aforementioned processes are realized by hardware.

As shown in FIG. 13, the network device includes a monitored item holder 100 which holds monitored items that are items to be monitored regarding a device by the network device on a device-by-device basis. A device specifier 102 specifies a device to which the network device is connected. A monitored item acquisition 104 acquires monitored items of the device specified by the device specifier 102 from the monitored item holder 100. A device monitor 106 monitors the connected device in accordance with the monitored items acquired by the monitored item acquisition 104.

The network device further includes a server acquisition 108 which, when the device specified by the device specifier 102 does not exist in the monitored item holder 100, acquires the monitored items of this device from the server. The network device further includes a storage 110 which stores the monitored items of the device acquired by the server acquisition 108 in the monitored item holder 100.

The network device further includes a server transmitter 112 which, when a device monitored last time and a device monitored this time are different, transmits a notice of cancellation of registration of the device monitored last time and a notice of registration of the device newly monitored to the server 20.

Moreover, the monitored item holder 100 also holds acquisition time information specifying a time when the monitored items were acquired. When acquiring the monitored items of the device specified by the device specifier 102 from the monitored item holder 100, the monitored item acquisition 104 acquires the acquisition time information from the monitored item holder 100, and acquires the monitored items of the device again from the server when a predetermined period of time has passed since the monitored items of the device were acquired.

Besides, as for each process explained in the aforementioned embodiments, it is possible to record a program to execute each process on a record medium such as a flexible disk, a CD-ROM (Compact Disc-Read Only Memory), a ROM, a memory card, or the like and distribute this program in the form of the record medium. In this case, the aforementioned embodiments can be realized by making the network device and/or the server 20 read the record medium on which this program is recorded and execute this program.

Additionally, the network device and/or the server 20 sometimes has other programs such as an operating system, other application programs, and the like. In this case, by using these other programs in the network device and/or the server 20, a command, which calls a program to realize a process equal to that in the aforementioned embodiments out of programs in the network device and/or the server 20, may be recorded on the record medium.

Moreover, such a program can be distributed not in the form of the record medium but in the form of a carrier wave via a network. The program transmitted in the form of the carrier wave over the network is incorporated in the network device and/or the server 20, and the aforementioned embodiments can be realized by executing this program.

Further, when being recorded on the record medium or transmitted as the carrier wave over the network, the program is sometimes encrypted or compressed. In this case, the network device and/or the server 20 which has read the program from the record medium or the carrier wave needs to execute the program after decrypting or expanding the program.

What is claimed is:

1. A network device connected between a connected device and a network, the network device comprising:
a monitored item holder which holds a list of monitored items, wherein the monitored item holder holds monitored items associated with device identification information of the connected device and holds monitored items associated with device identification information of other devices that can be connected to the network device;

a device identification information acquisition which acquires the device identification information of the connected device from the connected device;

a monitored item acquisition which acquires the monitored items associated with the device identification information of the connected device from the monitored item holder based on the device identification information acquired by the device identification information acquisition; and a device monitor which monitors the connected device to determine amounts of the monitored items associated the device identification information of the connected device.

2. The network device according to claim 1, further comprising a server acquisition which, when the monitored items of the device specified by the device identification information acquisition do not exist in the monitored item holder, acquires the monitored items of the connected device from a server.

3. The network device according to claim 2, further comprising a storage executor which stores the monitored items of the device acquired by the server acquisition in the monitored item holder.

4. The network device according to claim 3, further comprising a server transmitter which, when a device monitored last time and a device monitored this time are different, transmits a notice of cancellation of registration of the device monitored last time and a notice of registration of the device newly monitored to the server.

5. The network device according to claim 1, wherein the monitored item holder also holds acquisition time information which specifies a time when the monitored items were acquired.

6. The network device according to claim 5, wherein when the monitored item acquisition acquires the monitored items of the device specified by the device identification information acquisition from the monitored item holder, the monitored item acquisition acquires the acquisition time information from the monitored item holder, and when a predetermined period of time has passed since the monitored items of the device were acquired, the monitored items of the device are acquired again from a server.

7. The network device according to claim 5, wherein the acquisition time information on the monitored items of the device specified by the device identification information acquisition is acquired at predetermined time intervals, and the monitored items of the device are acquired again from a server when a predetermined period of time has passed since the monitored items of the device were acquired.

8. The network device according to claim 1, wherein the identification information is information regarding the model of the device.

9. The network device according to claim 8, wherein the network device is a network board of the connected device.

10. A method of monitoring a connected device by a network device provided between the connected device and a network, the method comprising:

acquiring device identification information of the connected device from the connected device, by the network device;

acquiring monitored items associated with the device identification information of the connected device from a monitored item holder based on the acquired device identification information, by the network device, wherein the monitored item holder holds a list of monitored items, and wherein the monitored item holder holds monitored items associated with device identification information of the connected device and holds monitored items associated with device identification information of other devices that can be connected to the network; and monitoring the connected device to determine amounts of the monitored items associated the device identification information of the connected device, by the network device.

11. The device motoring method according to claim 10, further comprising, when the monitored items of the specified connected device do not exist in the monitored item holder, acquiring the monitored items of the device from a server.

12. The device monitoring method according to claim 11, further comprising storing the acquired monitored items of the device in the monitored item holder.

13. The device monitoring method according to claim 12, further comprising, when a device monitored last time and a device monitored this time are different, transmitting a notice of cancellation of registration of the device monitored last time and a notice of registration of the device newly monitored to the server.

14. The device monitoring method according to claim 10, wherein the monitored item holder also holds acquisition time information which specifies a time when the monitored items were acquired.

15. The device monitoring method according to claim 14, further comprising the steps of:

when acquiring the monitored items of the connected device from the monitored item holder, acquiring the acquisition time information from the monitored item holder; and acquiring the monitored items of the device again from a server when a predetermined period of time has passed since the monitored items of the device were acquired.

16. The device monitoring method according to claim 14, further comprising the steps of:

acquiring the acquisition time information on the monitored items of the specified connected device at predetermined time intervals; and acquiring the monitored items of the device again from a server when a predetermined period of time has passed since the monitored items of the device were acquired.

17. The device monitoring method according to claim 10, wherein the identification information is information regarding the model of the device.

18. The device monitoring method according to claim 17, wherein the network device is a network board of the connected device.

\* \* \* \* \*